Feb. 8, 1966  F. H. RUSCHMANN  3,234,393
WOBBLE MOTOR FOR LIGHT TRACKER
Filed Dec. 10, 1962  3 Sheets-Sheet 2

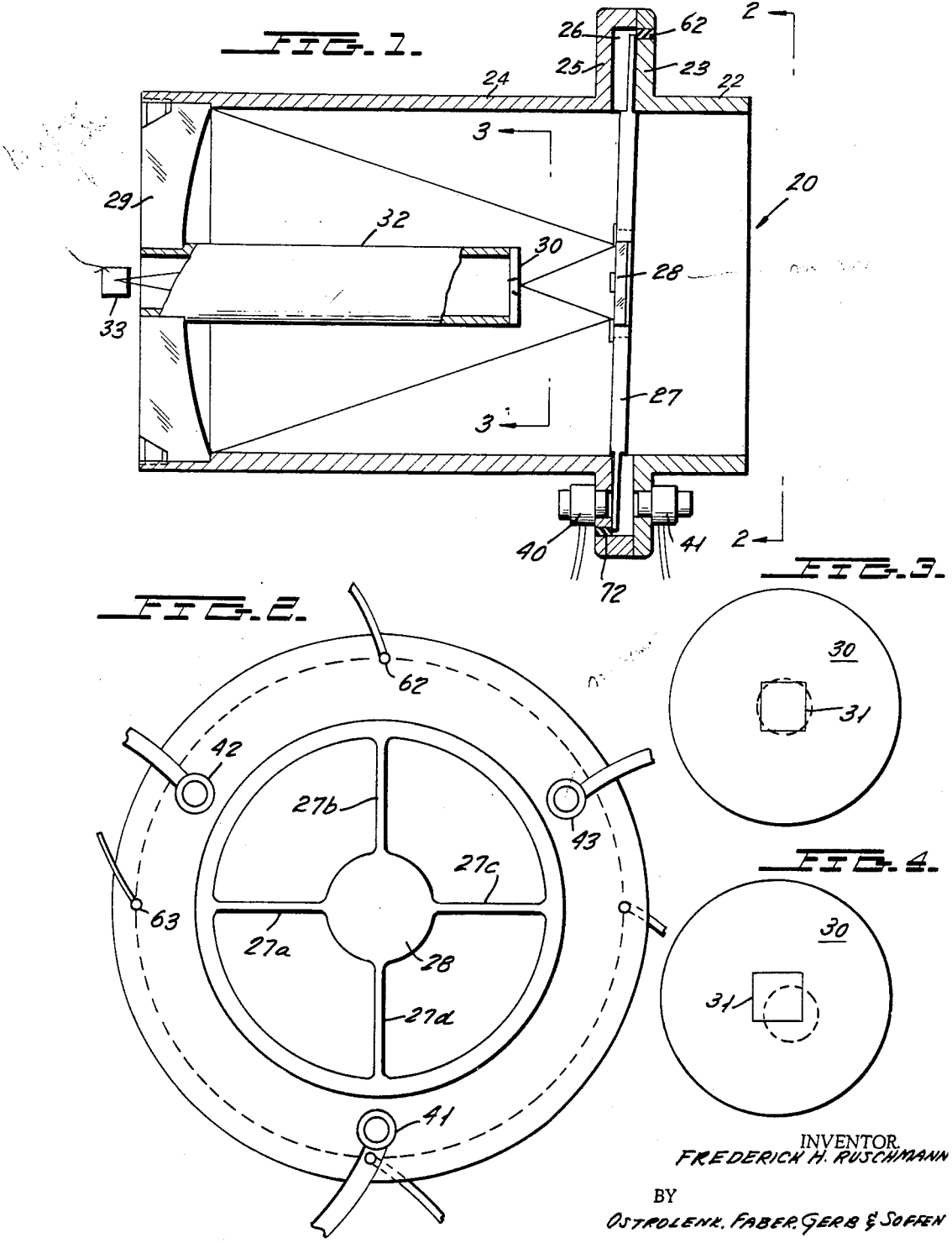

INVENTOR.
FREDERICK H. RUSCHMANN
BY
OSTROLENK, FABER, GERB & SOFFEN
ATTORNEYS

Feb. 8, 1966   F. H. RUSCHMANN   3,234,393
WOBBLE MOTOR FOR LIGHT TRACKER
Filed Dec. 10, 1962   3 Sheets-Sheet 3

INVENTOR.
FREDERICK H. RUSCHMANN
BY
OSTROLENK, FABER, GERB & SOFFEN
ATTORNEYS

United States Patent Office 3,234,393
Patented Feb. 8, 1966

3,234,393
WOBBLE MOTOR FOR LIGHT TRACKER
Frederick H. Ruschmann, Port Washington, N.Y.,
assignor to Kollsman Instrument Corporation,
Elmhurst, N.Y., a corporation of New York
Filed Dec. 10, 1962, Ser. No. 243,465
7 Claims. (Cl. 250—235)

This invention relates to a novel wobble motor, and more specifically relates to an actuating mechanism for oscillating the image of a light source with respect to a light-sensitive means to permit tracking of the light source.

Light tracking devices and scanning mechanism therefor are well known to the art.

Thus, a scanning mechanism may be provided wherein the image of a light source to be tracked is oscillated in the plane of a rectangular aperture whereby, so long as the rotating image continues to intersect the four corners of the square or rectangular aperture, information is obtained to the centering of the star or light source being tracked. However, once the image intersects portions of the aperture only once of twice during the rotation of the image, a signal is developed to indicate that the light source is not properly centered. Thus, corrective servo mechanisms are energized to redirect the telescope to bring the image back to a position wherein the center of rotation of the image is at the center of the aperture.

In accordance with the present invention, the image of the star or light source being tracked is reflected from, or operated upon by, an appropriate surface of a disc which rolls between two opposing surfaces enclosing the periphery of the disc in a wobble-type motion. Therefore, the image, for example, can be reflected by the disc with the reflected image rotating about a point on its focal plane due to the wobble motion of the disc.

The periphery of the disc rolls on the two aforementioned surfaces which enclose the periphery of the disc, whereby there is little wear between the disc and its support surfaces. Moreover, appropriate locations of the bearing surfaces have conductive segments therein which are diametrically opposed to one another; whereupon when the disc assumes some predetermined alignment, it will create an electrical circuit between diametrically opposed conductive segments on opposing bearing surfaces to thereby make possible the delivering of an electrical signal to indicate this particular alignment. This electrical signal is then utilized as a reference for the output signal due to the light source image which passes through the aperture.

Accordingly, a primary object of this invention is to provide a novel wobble motor.

Another object of this invention is to provide a novel scanning mechanism for a star tracker.

A further object of this invention is to provide a novel means for imparting a rotary-type motion to a disc which has low wear characteristics.

These and other objects of this invention will become apparent from the following description when taken in connection with the drawings, in which:

FIGURE 1 shows a partially cross-sectional side view of the novel wobble motor in connection with an optical relay system for a star tracker.

FIGURE 2 is a plan view as seen from the right of FIGURE 1, and particularly illustrates the configuration of the wobble disc.

FIGURE 3 is an enlarged diagram of the rectangular aperture at the beginning of the optical relay system of FIGURE 1 with the circular pattern of a star superimposed over the rectangular aperture.

FIGURE 4 is similar to FIGURE 3, and illustrates the star when it is off the axis of the telescope field.

Figure 7:
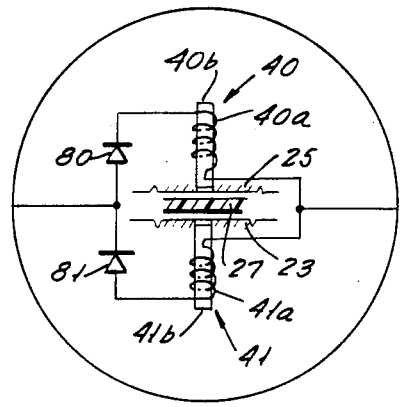

FIGURE 7 schematically illustrates the manner in which the opposing magnets of the wobble motor are electrically connected to one another for one pair of opposing magnets.

Figure 8:
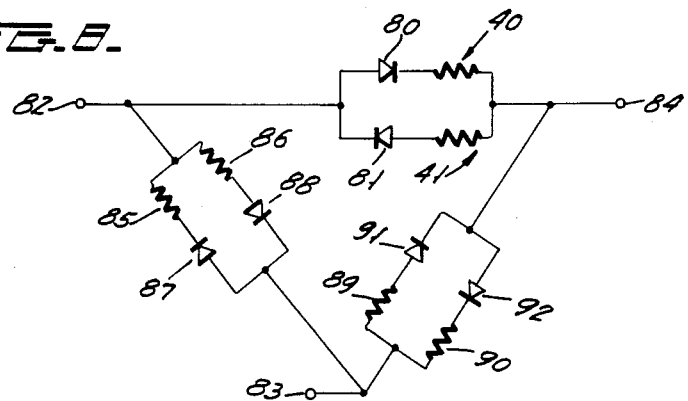

FIGURE 8 schematically illustrates the complete circuit for the three opposing pairs of magnets.

FIGURES 9a through 9f schematically illustrate magnetic forces acting upon the disc throughout 360 electrical degrees of operation.

Referring first to FIGURE 1, I have illustrated therein a telescope housing 20 which carries any appropriate objective system therein. Housing portion 22 is terminated in a flange 23 which serves as a first bearing surface, and in a similar manner, housing section 24 terminates in a flange surface 25 which serves as a second bearing surface and is spaced from flange surface 23, as illustrated, and secured thereto in any desired manner.

The annular space 26 between flanges 23 and 25 contains a wobble disc 27 which, as best seen in FIGURE 2, has a reflecting mirror 28 secured thereto by extending spider members 27a, 27b, 27c and 27d. Mirror 28 is concentric with the optical axis of the telescope.

The leftmost portion of the telescope 20 has a paraboloidal reflector objective element of the telescope 29 secured thereto. The reflector 29 and mirror surface 28 form a portion of a Cassegrainian type telescope system which has its focal plane in registry with and parallel to aperture plate 30 which, as best seen in FIGURES 3 and 4, has a rectangular aperture 31 therein.

The aperture plate 30 is carried at the end of the optical relay system contained in housing 32 which could include, for example, a system of condensing lenses which focuses the portion image of the light source observed by the telescope which passes through aperture 31 on an appropriate photosensor 33.

The extending flanges 23 and 25, which serve as bearing surfaces over which disc 28 may roll, each have three magnetic structures spaced from one another by 120°. The magnetic structures of each of the bearings are then adjacent one another to form three pairs of opposing structures. The magnetic structures seen in FIGURE 1 are magnetic structure 40 in flange 25 and magnetic structure 41 in flange 23. These magnetic structures may be secured to their respective flanges in openings placed in the flange and can be retained therein as by cementing.

As best seen in FIGURE 2, the plate 23 has the further magnetic structures 42 and 43 wherein structures 41, 42 and 43 are spaced from one another by 120°. Clearly, flange 25 will have two magnetic structures (not shown) which are in registry with magnetic structures 42 and 43 respectively.

Figure 5:
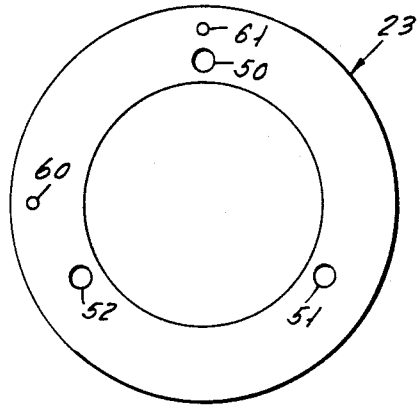
FIGURE 5 is a side plan view of the right-hand bearing surface of FIGURE 1.

FIGURE 5 shows a plan view of flange 23 as seen from the left of FIGURE 1, and illustrates the three openings 50, 51 and 52 which could receive magnetic structures 41, 42 and 43 respectively.

Figure 6:
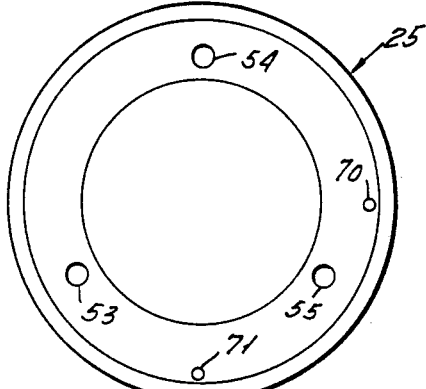
FIGURE 6 is a front plan view of the left-hand bearing surface of FIGURE 1.

The bearing surface of flange 25 is similarly shown in FIGURE 6 which illustrates openings 53, 54 and 55 which can receive the magnetic structures carried in this flange.

The bearing surfaces shown in FIGURES 5 and 6 are provided with further openings such as openings 60 and 61 (FIGURE 5) which can receive conductive segments which will contact disc 27 as the disc 27 rolls over the surface of the bearing. Thus, as shown in FIGURE 1, a conductive segment 62 is carried in opening 61 of FIGURE 5, while a similar conductive segment 63 is carried in opening 60 of FIGURE 5, as shown in FIGURE 2.

The surface 25 has a pair of openings 70 and 71 therein which are respectively 180° displaced from openings 60 and 61 in flange 23 with these openings similarly receiving conductive segments such as the conductive segment 72 shown in FIGURE 1 which would be received in opening 71 of FIGURE 6.

The manner in which the two opposing magnets of any pair of opposing magnets are arranged is best shown in schematic view in FIGURE 7 for the case of magnet structures 40 and 41 which each comprise energizing windings 40a and 41a respectively on magnetic armatures 40b and 41b respectively. At least the periphery of disc 27 is of magnetic material. Thus, it will respond to energization of the coils of structures 40 and 41.

The two structures 40 and 41 are provided with respective switching diodes 80 and 81, and the coils and their diodes are connected in parallel with one another and in series with an A.-C. source of power. It will, therefore, be readily understood that when the driving current is of one polarity, only coil 40 will be energized with diode 81 preventing current flow through coil 41, whereupon the portion of disc 27 adjacent magnetic structure 40 will be attracted toward magnetic structure 40. When the driving current reverses in polarity, an opposite action will occur whereby current flow is only through coil 41 so that the portion of disc 27 adjacent magnetic structure 41 will be biased downwardly.

The various magnet structures of the complete system are then connected as schematically illustrated in FIGURE 8 wherein the energizing systems are connected in delta and are energized from a source of three-phase current connected to terminals 82, 83 and 84.

The aforementioned magnet structures 40 and 41 and their respective switching diodes 80 and 81 are connected between the terminals 82 and 84. The second pair of opposing magnet structures are comprised of opposing magnet structures 85 and 86 which have respective switching diodes 87 and 88 where the structures 85 and 86 could, for example, be contained in openings 52 and 53 respectively of FIGURES 5 and 6 respectively. The last pair of opposing magnet structures are formed of magnet structures 89 and 90 which are provided with switching diodes 91 and 92 respectively where the magnet structures 89 and 90 could, for example, be contained within openings 51 and 54 respectively of FIGURES 5 and 6 respectively.

It will be noted that magnet structures 85 and 89 would correspond to magnet structures 42 and 43 respectively of FIGURE 2.

When a source of three-phase power is connected to the magnet drive system as illustrated in FIGURE 8, the magnetic forces applied to disc 27 will be as shown in FIGURES 9a through 9f for 360 electrical degrees.

In FIGURES 9a through 9f, arrows have been placed at the locations of the opposing magnet structures and indicate the direction in which magnetic forces are applied to the wobble disc. A dotted line schematically indicates a line on the disc to indicate the manner in which it progresses around the circle.

Figure 9A:
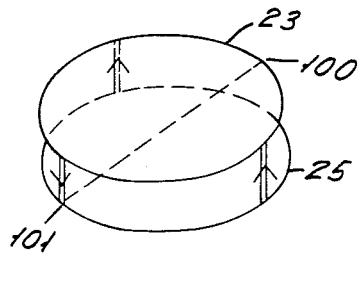
Figure 9B:
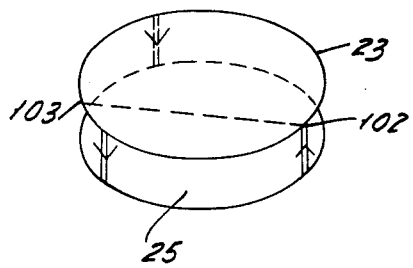
Figure 9C:
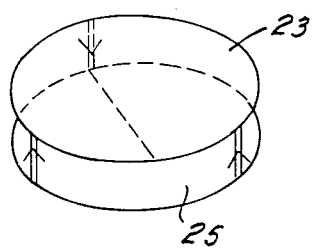
Figure 9D:
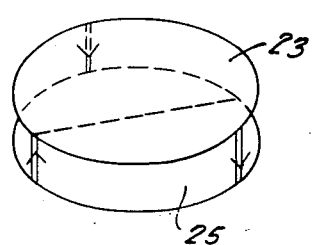
Figure 9E:
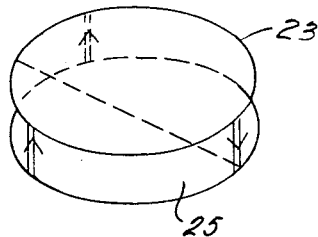

Throughout one cycle, it will be observed that the magnetic forces are initially such that the disc contacts the bearing surfaces 23 and 25 at locations 100 and 101. As time progresses, the magnetic forces of the opposing magnet structures change, as shown in FIGURE 9b, whereupon the disc nutates from contact at points 100 and 101 to contact points 102 and 103 on bearing surfaces 23 and 25 respectively.

Figure 9F:
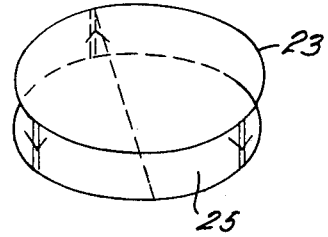

As will be readily observed from FIGURES 9c, 9d, 9e and 9f, the continuous reversal of magnetic flux in the various magnet structures causes the disc to nutate completely around until, at FIGURE 9f, it is almost back to its original position.

As the wobble disc goes through this motion, it will cause electrical connection between contact segments 62 and 72 in FIGURE 1 and a similar pair of contact segments at right angles to the line of segments 62 and 72. Thus, a reference signal can be generated to indicate the exact placement of disc 27 for every 90° of motion.

The nutating or wobble motion of the disc 27 will clearly cause oscillation of the image of the light source being tracked on the apertured plate 30. If the star is in the center of the telescope field, as schematically illustrated in FIGURE 3, when the star image rotates around the rectangular aperture 31, it will cross the corners of the aperture and be occulted by the sides of the aperture to thereby create four separate signal pulses. Therefore, when the telescope is properly aligned with respect to a star being tracked, a star signal from the photosensor 33 will be modulated at four times the operating frequency of the wobble motor.

However, if the star is not aligned with the telescope axis, as illustrated in FIGURE 3, as it rotates on disc 30 due to the nutating motion of disc 27, the star signal will be modulated at a frequency of twice the operating frequency of the wobble motor. Thus, the photosensor 33, along with reference signals derived from contact segments such as segments 62–72, will deliver electrical signals to appropriate corrective mechanism which redirects the telescope in an effort to retain the signal created when the telescope is appropriately aligned.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

What is claimed is:

1. A wobble motor comprising a first and second ring-shaped bearing surfaces opposing one another and a magnetic disc contained between said opposing ring-shaped bearings; each of said first and second bearing surfaces having a plurality of energizable magnetic structures connected thereto for each exerting a force of attraction on the portion of said disc adjacent to said magnetic structures; an energizing means for said magnet structures; said magnetic structures being sequentially energized by said energizing means to produce a force which progresses around the periphery of said disc in a predetermined manner; each of said magnet structures for said first magnetic structure being positioned opposite a respective magnetic structure of said second bearing surface.

2. A wobble motor comprising a first and second ring-shaped bearing surfaces opposing one another and a magnetic disc contained between said opposing ring-shaped bearings; each of said first and second bearing surfaces having a plurality of energizable magnetic structures connected thereto for each exerting a force of attraction on the portion of said disc adjacent to said magnetic structures; an energizing means for said magnet structures; said magnetic structures being sequentially energized by said energizing means to produce a force which progresses around the periphery of said disc in a predetermined manner; each of said magnet structures for said first magnetic structure being positioned opposite a respective magnetic structure of said second bearing surface; said first and second bearing surfaces having respective conductive electrodes embedded therein; said conductive electrodes being 180° away from one another whereby said disc completes a circuit between said electrodes when said disc has an angular position to engage said electrodes.

3. In combination for a star tracker; a wobble motor, a telescope, and a light-sensing means; said wobble motor comprising a first and second ring-shaped bearing surfaces opposing one another and a magnetic disc containing between said opposing ring-shaped bearings; each of said first and second bearing surfaces having a plurality of energizable magnetic structures connected thereto for each exerting a force of attraction on the portion of said disc adjacent to said magnetic structures; an energizing means for said magnet structures; said magnetic structures being sequentially energized by said energizing means to produce a force which progresses around the periphery of said disc in a predetermined manner; said magnetic disc having a light reflecting means thereon; said light reflecting means being positioned to reflect the light gathered by said telescope; said light-sensing means being positioned to receive light reflected by said light reflecting means; said disc causing said reflected light to rotate with respect to said light-sensing means.

4. A wobble motor comprising a first and second ring-shaped bearing surfaces opposing one another and a magnetic disc contained between said opposing ring-shaped bearings; each of said first and second bearing surfaces having a plurality of energizable magnetic structures connected thereto for each exerting a force of attraction on the portion of said disc adjacent to said magnetic structures; an energizing means for said magnet structures; said magnetic structures being sequentially energized by said energizing means to produce a force which progresses around the periphery of said disc in a predetermined manner; each of said magnet structures for said first magnetic structure being positioned opposite a respective magnetic structure of said second bearing surface; each of said opposing pairs of magnetic structures including an energizing winding; each of said energizing windings of said pairs of magnetic structures being connected in series with a respective switching means and in parallel with one another, said parallel windings being connected in series with an A.-C. source whereby only one winding of each of said pairs can conduct current.

5. A wobble motor comprising a first and second ring-shaped bearing surfaces opposing one another and a magnetic disc contained between said opposing ring-shaped bearings; each of said first and second bearing surfaces having a plurality of energizable magnetic structures connected thereto for each exerting a force of attraction on the portion of said disc adjacent to said magnetic structures; an energizing means for said magnet structures; said magnetic structures being sequentially energized by said energizing means to produce a force which progresses around the periphery of said disc in a predetermined manner; each of said magnet structures for said first magnetic structure being positioned opposite a respective magnetic structure of said second bearing surface; each of said opposing pairs of magnetic structures including an energizing winding; each of said energizing windings of said pairs of magnetic structures being connected in series with a respective switching means and in parallel with one another, said parallel windings being connected in series with an A.-C. source whereby only one winding of each of said pairs can conduct current; said magnetic disc having a light reflecting surface portion thereon.

6. A wobble motor comprising a first and second ring-shaped bearing surfaces opposing one another and a magnetic disc contained between said opposing ring-shaped bearings; each of said first and second bearing surfaces having a plurality of energizable magnetic structures connected thereto for each exerting a force of attraction on the portion of said disc adjacent to said magnetic structures; an energizing means for said magnet structures; said magnetic structures being sequentially energized by said energizing means to produce a force which progresses around the periphery of said disc in a predetermined manner; each of said magnet structures for said first magnetic structure being positioned opposite a respective magnetic structure of said second bearing surface; each of said opposing pairs of magnetic structures including an energizing winding; each of said energizing windings of said pairs of magnetic structures being connected in series with a respective switching means and in parallel with one another, said parallel windings being connected in series with an A.-C. source whereby only one winding of each of said pairs can conduct current; said switching means comprising switching diodes.

7. In combination for a star tracker; a wobble motor, a telescope, and a light-sensing means; said wobble motor comprising a first and second ring-shaped bearing surfaces opposing one another and a magnetic disc contained between said opposing ring-shaped bearings; each of said first and second bearing surfaces having a plurality of energizable magnetic structures connected thereto for each exerting a force of attraction on the portion of said disc adjacent to said magnetic structures; an energizing means for said magnet structures; said magnetic structures being sequentially energized by said energizing means to produce a force which progresses around the periphery of said disc in a predetermined manner; said magnetic disc having a light reflecting means thereon; said light reflecting means being positioned to reflect the light gathered by said telescope; said light-sensing means being positioned to receive light reflected by said light reflecting means; said disc causing said reflected light to rotate with respect to said light-sensing means; said first and second bearing surfaces having respective conductive electrodes embedded therein; said conductive electrodes being 180° away from one another whereby said disc completes a circuit between said electrodes when said disc has an angular position to engage said electrodes.

References Cited by the Examiner

UNITED STATES PATENTS

| | | | |
|---|---|---|---|
| 2,275,827 | 3/1942 | Plensler | 310—82 |
| 2,981,843 | 4/1961 | Hansen | 250—203 |
| 3,071,036 | 1/1963 | McKnight et al. | 88—74 |

FOREIGN PATENTS 876,344  8/1961  Great Britain.

RALPH G. NILSON, *Primary Examiner.*